United States Patent
Hsu

(10) Patent No.: US 7,212,259 B2
(45) Date of Patent: May 1, 2007

(54) LIQUID CRYSTAL DISPLAY HAVING COLOR FILTERS WITH RECESS STRUCTURES

(75) Inventor: Jui-Mei Hsu, Tainan Hsien (TW)

(73) Assignee: Chi Mei Optoelectronics Corporation, Tainan Hsien (TW)

(*) Notice: Subject to any disclaimer, the term of this patent is extended or adjusted under 35 U.S.C. 154(b) by 0 days.

(21) Appl. No.: 10/605,416

(22) Filed: Sep. 30, 2003

(65) Prior Publication Data

US 2004/0105050 A1 Jun. 3, 2004

(30) Foreign Application Priority Data

Oct. 17, 2002 (TW) ............................. 91123984 A

(51) Int. Cl.
*G02F 1/1335* (2006.01)
(52) U.S. Cl. .................... 349/106; 349/113; 349/114
(58) Field of Classification Search ............... 349/106, 349/113, 114
See application file for complete search history.

(56) References Cited

U.S. PATENT DOCUMENTS

| | | | | | |
|---|---|---|---|---|---|
| 5,734,456 | A | * | 3/1998 | Takao et al. ................. | 349/106 |
| 6,118,505 | A | * | 9/2000 | Nagata et al. ............... | 349/106 |
| 6,501,521 | B2 | * | 12/2002 | Matsushita et al. ......... | 349/106 |
| 6,618,107 | B1 | * | 9/2003 | Tanaka et al. ............... | 349/106 |
| 6,819,375 | B2 | * | 11/2004 | Wachi .......................... | 349/106 |
| 6,833,892 | B2 | * | 12/2004 | Kamijo ........................ | 349/115 |
| 2002/0018159 | A1 | * | 2/2002 | Kim et al. ................... | 349/106 |
| 2002/0033912 | A1 | * | 3/2002 | Tanaka et al. ............... | 349/106 |
| 2003/0147026 | A1 | * | 8/2003 | Wachi .......................... | 349/106 |

* cited by examiner

*Primary Examiner*—David Nelms
*Assistant Examiner*—(Nancy) Thanh-Nhan P Nguyen
(74) *Attorney, Agent, or Firm*—Winston Hsu

(57) ABSTRACT

A liquid crystal display includes a lower substrate, an upper substrate positioned parallel with the lower substrate, and a plurality of pixel units between the lower substrate and the upper substrate. Each pixel unit includes an upper transparent electrode, a liquid crystal layer, a lower transparent electrode, and a color filter with recess structures.

13 Claims, 6 Drawing Sheets

LIQUID CRYSTAL DISPLAY HAVING COLOR FILTERS WITH RECESS STRUCTURES

BACKGROUND OF INVENTION

1. Field of the Invention

The present invention relates to a liquid crystal display (LCD), and more particularly, to an LCD comprising color filters with recess structures.

2. Description of the Prior Art

Due to low prices and high quality of liquid crystal displays (LCDs), the LCD is widely applied in notebooks, PDAs, mobile phones, and so on.

Please refer to FIG. 1. FIG. 1 shows a sectional view of a conventional color LCD 11. The color LCD 11 comprises a lower glass substrate 9, an upper glass substrate 2 positioned parallel to and above the lower glass substrate 9, and a plurality of pixel units (not shown in FIG. 1) positioned between the lower glass substrate 9 and the upper glass substrate 2, each of the pixel units including a red color filter 3R, a green color filter 3G, or a blue color filter 3B. An inner surface of the upper glass substrate 2 includes an upper transparent electrode 4, and an inner surface of the lower glass substrate 9 includes a lower transparent electrode 8 and a plurality of thin film transistors (not shown in FIG. 1) for controlling the pixel units. Furthermore, a liquid crystal layer 6 is positioned between the upper glass substrate 2 and the lower glass substrate 9, and an exposed portion of an outer surface of the upper glass substrate 2 and an exposed portion of another surface of the lower glass substrate 9 respectively include an upper polarizer 1 and a lower polarizer 10. The above-mentioned color LCD 11 is a transmissive color LCD. A reflective color LCD similar to the transmissive color LCD further comprises a reflection layer (not shown in FIG. 1) positioned between the color filters 3R, 3G, 3B and the lower glass substrate 9. Additionally, a transflective color LCD comprises a diffusion layer (not shown in FIG. 1) positioned between the upper polarizer 1 and the lower polarizer 10.

Since the transmissive LCD is a passive luminous device, a backlight source (not shown in FIG. 1) positioned behind the lower glass substrate 9 is required for the color LCD 11. A white light is radiated from the backlight source and passes through the color filters 3R, 3G, 3B so as to enable each of the pixel units to respectively display a red light, a green light, and a blue light. However, only portions of the white light with specific wavelengths can pass through the color filters. For the reflective color LCD, the white light radiated from the backlight source has to pass through the color filters and reach a surface of the reflection layer, then the light is reflected by the reflection layer and again passes through the color filters for respectively displaying a red light, a green light, and a blue light. Consequently, comparing to the transmissive color LCD, the color deepness of the reflective color LCD is greater, and the problem of the reflective color LCD having insufficient brightness is more serious.

For solving the above-mentioned problems, a conventional color LCD 15 comprises light transmitting holes 18 respectively formed in the color filters 16R, 16G, 16B of each pixel unit, as shown in FIG. 2. Therefore, the transmittance of the color filters 16R, 16G, 16B can be increased for improving a brightness of a transmissive color LCD or a reflective color LCD, and a color deepness of the transmissive color LCD or the reflective color LCD is also regulated. However, the method of forming holes 18 in the color filters 16R, 16G, 16B results in a non-uniform cell gap 19, and an overcoating layer 17 is required for covering the color filters 16R, 16G, 16B. Because the gap 19 caused by the formation of the holes 18 is great, the overcoating layer 17 formed for planarization is not so effective, and a stability and a quality of the LCD 15 is reduced.

SUMMARY OF INVENTION

It is therefore an objective of the claimed invention to provide an LCD comprising color filters with recess structures for solving the above-mentioned problems.

According to the claimed invention, a liquid crystal display comprises a lower substrate, an upper substrate positioned parallel with the lower substrate, and a plurality of pixel units between the lower substrate and the upper substrate. Each pixel unit includes an upper transparent electrode, a liquid crystal layer, a lower transparent electrode, and a color filter with recess structures.

According to the claimed invention, a liquid crystal display comprises a lower substrate, an upper substrate positioned parallel with the lower substrate, and a plurality of pixel units, each of the pixel units including an upper transparent electrode, a liquid crystal layer, a lower transparent electrode, and a color filter and wherein each of the color filters includes both a first region and a second region, and a surface of the first region has a plurality of recess structures.

The color LCD provided by the claimed invention comprises color filters with recess structures. Consequently, the transmittance of the color filters can be effectively increased, which results in improving a brightness of the LCD. Also, the problem of a non-uniform cell gap caused by forming holes in the color filters according to a conventional method can be prevented. Additionally, the recess structures of the color filters are able to scatter light. Therefore, a diffusing layer of a transflective LCD can be replaced by the color filters with recess structures, and a cost of the transflective LCD is substantially reduced.

These and other objectives of the claimed invention will no doubt become obvious to those of ordinary skill in the art after reading the following detailed description of the preferred embodiment, which is illustrated in the multiple figures and drawings.

DETAILED DESCRIPTION

Figure 1:
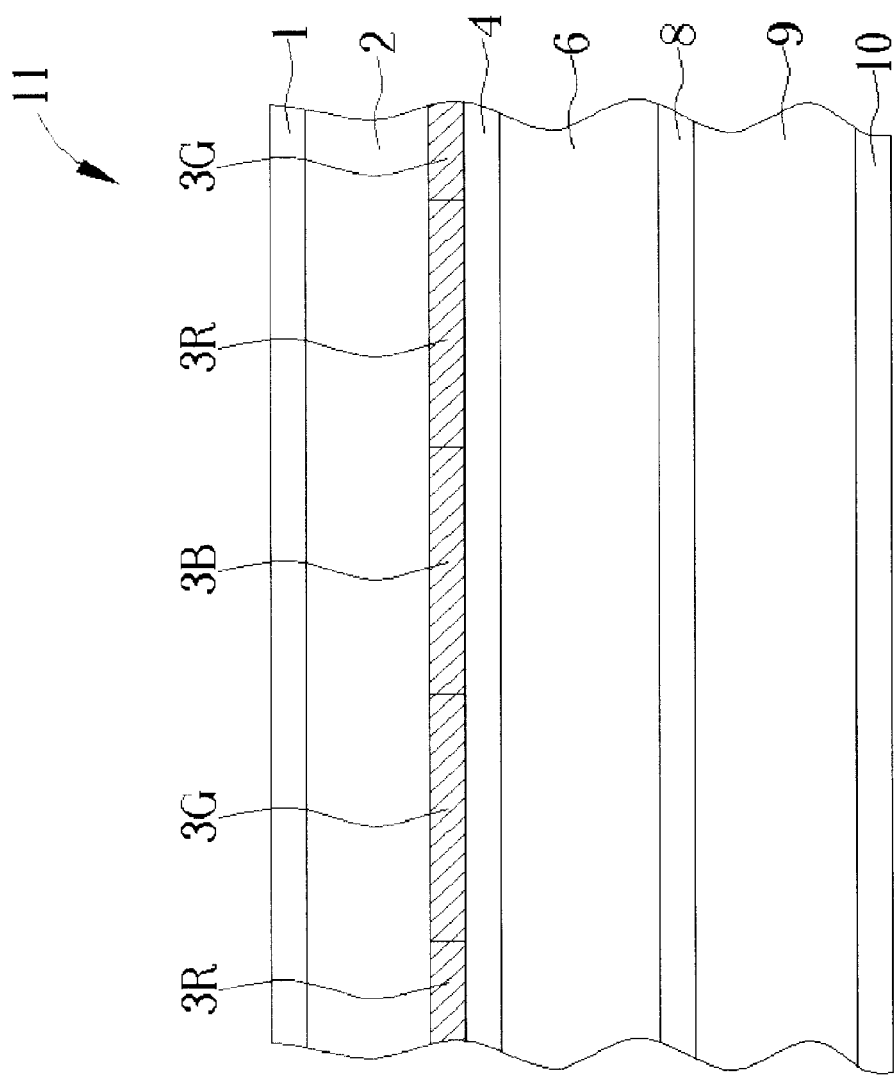
FIG. 1 is a sectional view of a conventional color LCD.
Figure 2:
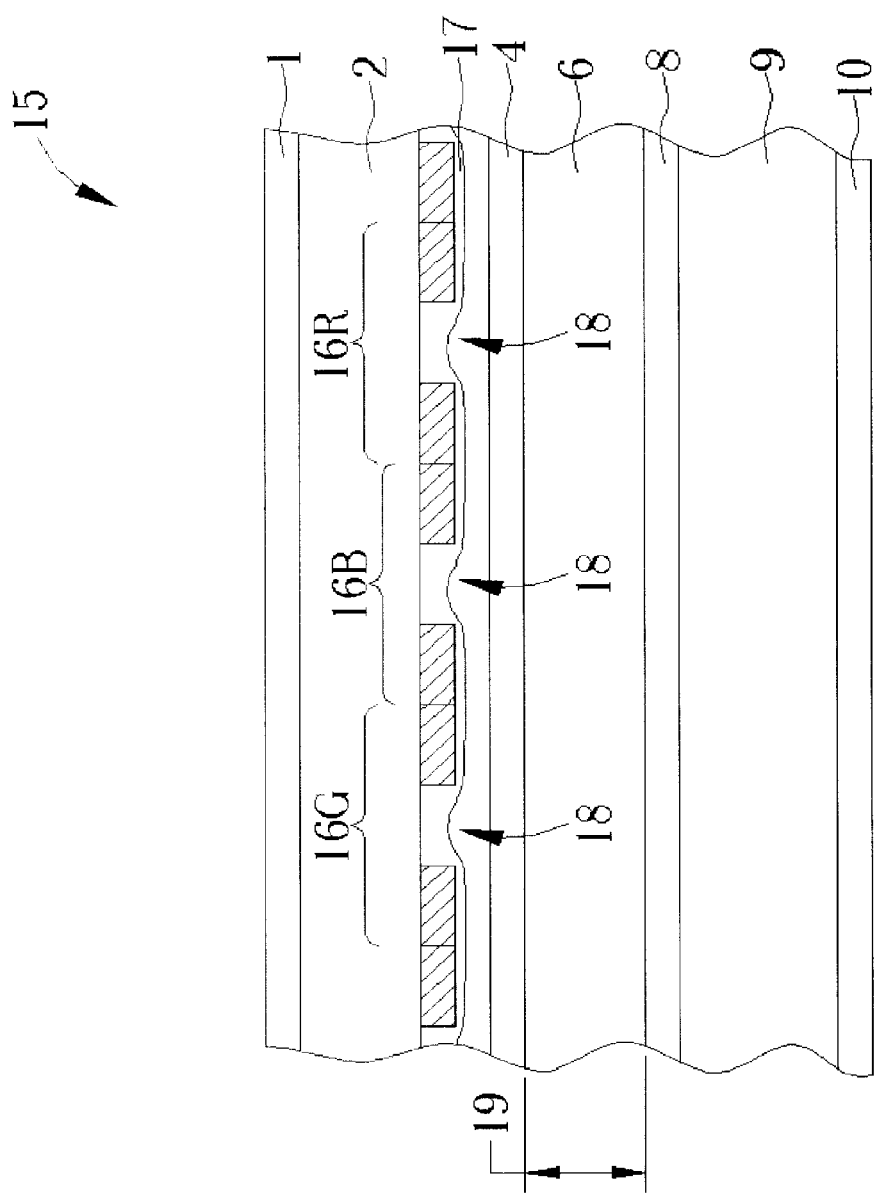
FIG. 2 is a sectional view of a conventional color LCD comprising color filters with hole structures.
Figure 3:
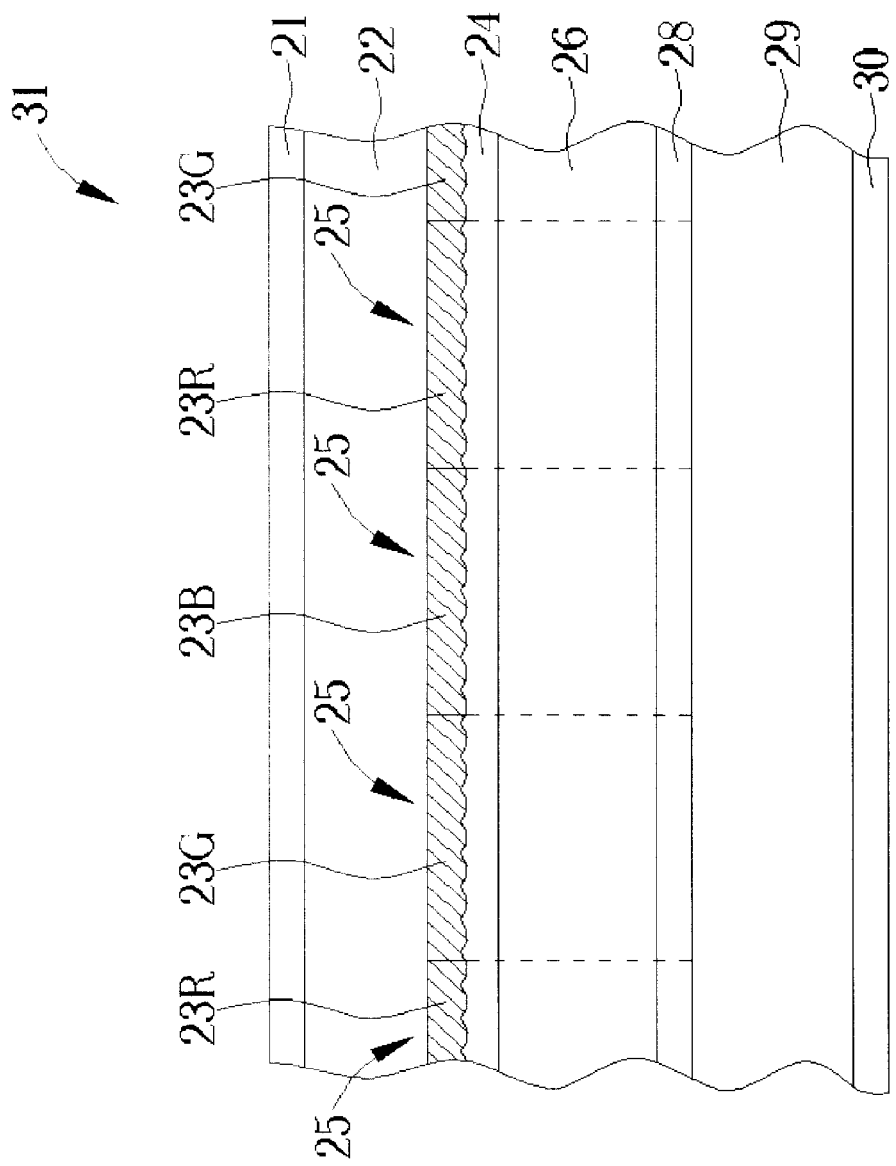
FIG. 3 is a sectional view of a color LCD comprising color filters with recess structures according to a first embodiment of the present invention.

First, a transmissive color LCD is provided as a first embodiment of the present invention, as shown in FIG. 3.

Comparing to the conventional color LCD 11, the color LCD 31 of the present invention also comprises a lower glass substrate 29, an upper glass substrate 22 positioned parallel to and above the lower glass substrate 29, a plurality of pixel units 25 positioned between the lower glass substrate 29 and the upper glass substrate 22, and a plurality of thin film transistors (not shown in FIG. 3) positioned on a top surface of the lower glass substrate 29, which are used to control each of the pixel units 25. Each of the pixel units 25 includes a red color filter 23R, a green color filter 23G, or a blue color filter 23B, and an upper transparent electrode 24, a liquid crystal layer 26, and a lower transparent electrode 28. An exposed portion of an outer surface of the upper glass substrate 22 and an exposed portion of an outer surface of the lower glass substrate 29 respectively includes an upper polarizer 21 and a lower polarizer 30.

The main difference between the color LCD 31 of the present invention and the conventional transmissive color LCD 11 is that the color LCD 31 uses a predetermined mask pattern design including a plurality of matrix or interlaced patterns to reduce a resolution of the patterns and also uses the restriction of photo resist due to the reduced resolution to form a plurality of recess structures with either uniform size or non-uniform size on surfaces of the color filters 23R, 23G, 23B during a development process. And, the recess structures comprise the convex structures and valley structures. Therefore, the transmittance of the color filters 23R, 23G, 23B is increased, and the brightness of the color LCD 31 is effectively improved.

The present invention can also use the predetermined mask pattern design to form the recess structures only on portions of the surfaces of the color filters 23R, 23G, 23B. The area of the portions of surfaces including the recess structure and the distribution density of the recess structures can be changed to regulate a brightness and color deepness of the color LCD 31 so as to enable the LCD 31 to display a desired brightness and color deepness. In other words, when the area of the surfaces including the recess structures is greater, the transmittance of the color filters is also greater, and the brightness of the color LCD 31 is improved and the color of the color LCD 31 is not deep. When the distribution density of the recess structures is greater, the transmittance of the color filters is also greater, the brightness of the color LCD 31 is improved and the color of the color LCD 31 is not deep.

Figure 4:
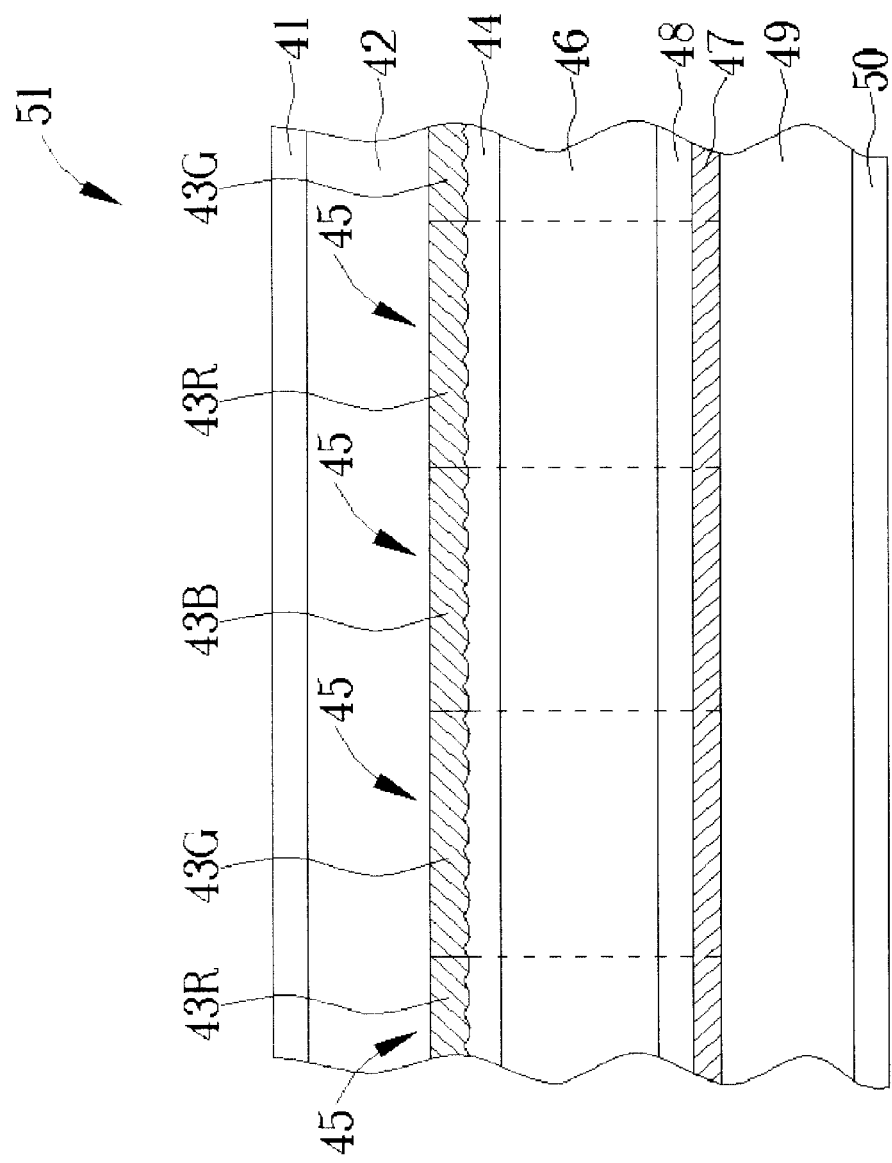
FIG. 4 is a sectional view of a color LCD comprising color filters with recess structures according to a second embodiment of the present invention.

Additionally, the color filters with recess structures of the present invention can also be applied to a reflective or a transflective color LCD. A reflective color LCD 51 is provided as a second embodiment of the present invention, as shown in FIG. 4. The reflective color LCD 51 comprises a lower glass substrate 49, an upper glass substrate 42 positioned parallel to and above the lower glass substrate 49, and a plurality of pixel units 45 positioned between the lower glass substrate 49 and the upper glass substrate 42. Each of the pixel units 45 includes a red color filter 43R, a green color filter 43G, or a blue color filter 43B, and an upper transparent electrode 44, a liquid crystal layer 46, a lower transparent electrode 48, and a reflection layer 47. An exposed portion of the surfaces of the upper glass substrate 42 and the lower glass substrate 49 respectively includes an upper polarizer 41 and a lower polarizer 50. The reflective color LCD 51 further comprises a plurality of thin film transistors (not shown in FIG. 4) for controlling the pixel units 45. A plurality of recess structures are formed on surfaces of the color filters so as to increase the transmittance of the color filters and further improve the brightness and regulate the color deepness of the color LCD 51. And, the recess structures comprise the convex structures and valley structures.

According to the second embodiment of the present invention, the recess structures are distributed completely on the surfaces of the color filters 43R, 43G, 43B. However, the recess structures can only formed on portions of the surfaces of the color filters 43R, 43G, 43B by using a different mask pattern design. Consequently, the area of the portions of surfaces including the recess structure and the distribution density of the recess structures can be changed to regulate a brightness and color deepness of the color LCD 51 so as to enable the LCD 51 to display a desired brightness and color deepness.

Finally, a transflective color LCD is provided as a third embodiment of the present invention. Each pixel unit of the transflective color LCD, which is similar to the pixel unit of the reflective color LCD, comprises a color filter, an upper transparent electrode, a liquid crystal layer, a lower transparent electrode, and a reflection layer. The reflection layer further comprises an opening, and therefore a transmissive region of the LCD is produced by the opening and a region of the color filter opposite to the opening of the reflection layer. Comparatively, because the reflection layer is positioned under and outside of the transmissive region of the LCD, a reflective region of the LCD is formed. Consequently, each pixel unit can use ambient light passing through the reflective region of the color filter or use back light passing through the transmissive region of the color filter to display a red light, a green light, or a blue light.

Figure 5:
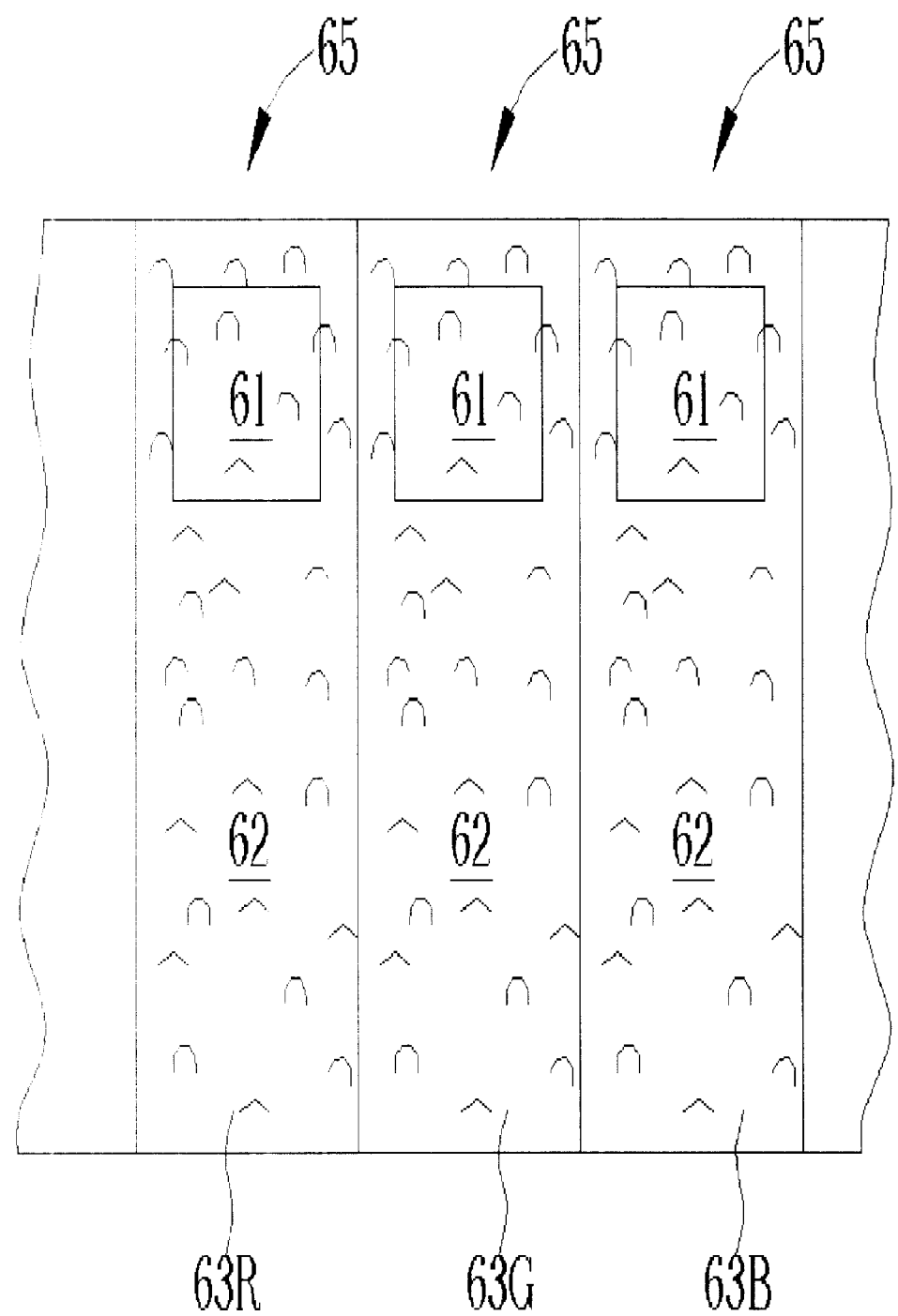
FIG. 5 is a top view of each pixel unit of a transflective color LCD according to a third embodiment of the present invention.

FIG. 5 is a top view of each pixel unit 65 of a transflective color LCD (not shown in FIG. 5) according to a third embodiment of the present invention. As shown in FIG. 5, the color filters 63R, 63G, 63B of each pixel unit 65 respectively comprise a transmissive region 61 and a reflective region 62. A plurality of recess structures are formed both on surfaces of the transmissive region 61 and the reflective region 62 so as to improve brightness and regulate a color deepness of the transflective color LCD. Furthermore, a diffusing layer (not shown in FIG. 5) is usually required for the transflective color LCD to increase an illumination cone. However, because the recess structures of the color filters 63R, 63G, 63B are able to scatter light, the above-mentioned diffusing layer can be replaced by the color filters 63R, 63G, 63B with recess structures, and a cost of the transflective LCD is substantially reduced.

Figure 6:
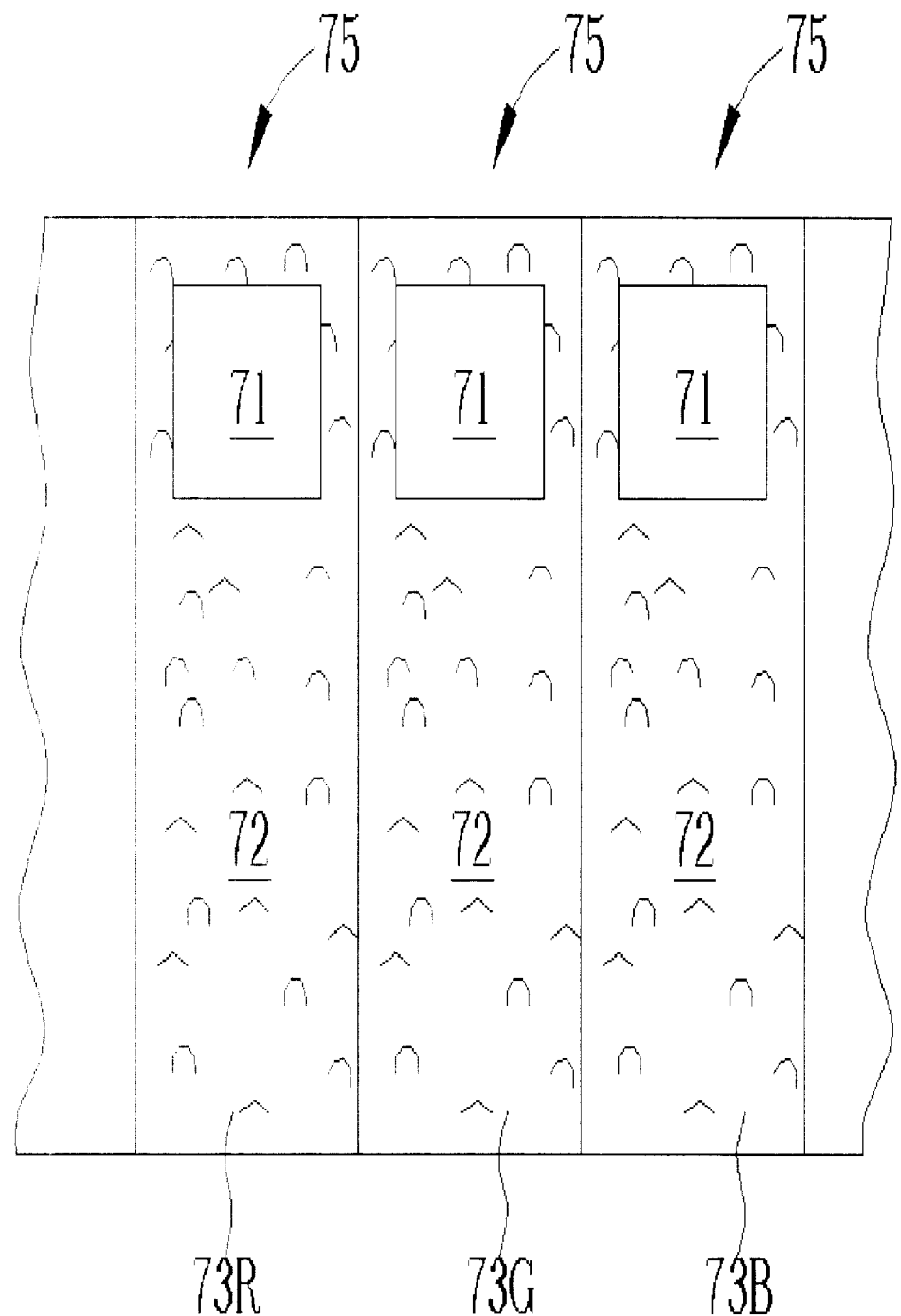
FIG. 6 is a top view of each pixel unit of a transflective color LCD according to a fourth embodiment of the present invention.

FIG. 6 is a top view of each pixel unit 75 of a transflective color LCD according to a fourth embodiment of the present invention. As shown in FIG. 6, only surfaces of reflective regions 72 of the color filters 73R, 73G, 73B include a plurality of recess structures. When a conventional transflective color LCD displays an image, for each pixel unit, ambient light passes through the reflective region of the color filter twice, and backlight only passes through the transmissive region of the color filter once, which results in poor brightness and a deeper color deepness of the reflective region in the same pixel unit. Therefore, according to the fourth embodiment of the present invention, the recess structures are only formed on surfaces of reflective regions 72 of the color filters 73R, 73G, 73B to regulate brightness and the color deepness. Consequently, a difference in brightness and color deepness occurred between the reflective region 72 and the transmissive region 71 of the same pixel unit 75 can be reduced.

The color LCD provided by the present invention comprises color filters with recess structures. And, the recess structures comprise the convex structures and valley structures. Consequently, the transmittance of the color filters can be effectively increased, which results in an improvement of brightness of the LCD, and a color deepness of the color LCD can be regulated. Comparing to a prior art color LCD, the problem of a non-uniform cell gap caused by forming holes in the color filters can be prevented. For a transflective color LCD, the recess structures of the present invention can be formed only on surfaces of reflective regions of the color filters so as to reduce a difference in brightness and color deepness occurred between the reflective region and the transmissive region of the same pixel unit. Furthermore, because the color filters with recess structures are able to scatter light, a diffusing layer of the transflective LCD can be omitted, and a cost of the transflective LCD is substantially reduced.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A liquid crystal display comprising:
   a lower substrate;
   an upper substrate positioned parallel with the lower substrate; and
   a plurality of pixel units, each of the pixel units including an upper transparent electrode, a liquid crystal layer, a lower transparent electrode, and a color filter formed on the upper substrate and above the lower substrate;
   wherein a surface of each color filter has a plurality of curved convex structures, and the upper transparent electrode directly contacts and covers the curved convex structures on the surface of each of the color filters.

2. The liquid crystal display of claim 1 wherein the surface of each color filter which has the plurality of curved convex structures is able to scatter light.

3. The liquid crystal display of claim 1 wherein a distribution density of the curved convex structures is used to regulate brightness and a color deepness of the liquid crystal display.

4. The liquid crystal display of claim 1 wherein each of the pixel units respectively comprises a reflection layer positioned between the color filter and the lower substrate.

5. The liquid crystal display of claim 4 being a reflective liquid crystal display.

6. The liquid crystal display of claim 4 wherein each of the reflection layers includes an opening.

7. The liquid crystal display of claim 6 being a semi-transmissive and semi-reflective liquid crystal display.

8. The liquid crystal display of claim 1 further comprising a plurality of thin film transistors for respectively controlling each of the pixel units.

9. The liquid crystal display of claim 8 wherein the thin film transistors are formed on the lower substrate and below the upper substrate.

10. The liquid crystal display of claim 1 wherein each of the curved convex structures comprises a smooth surface.

11. The liquid crystal display of claim 1 wherein each of the curved convex structures comprises a spherical surface.

12. The liquid crystal display of claim 1 wherein each of the pixel units comprises three of the color filters having a plurality of the curved convex structure respectively.

13. The liquid crystal display of claim 1 wherein the curved convex structures have non-uniform sizes.

* * * * *